United States Patent

Guery

[15] 3,653,872
[45] Apr. 4, 1972

[54] PROCESS FOR THE PREPARATION OF A NITROPHOSPHATE FERTILIZER

[72] Inventor: Arieh Y. Guery, Rijswijk, Netherlands
[73] Assignee: Badger N.V., The Hague, Netherlands
[22] Filed: Dec. 5, 1969
[21] Appl. No.: 882,603

[30] Foreign Application Priority Data

Dec. 18, 1968 Netherlands..................6818164

[52] U.S. Cl..........................................71/35, 23/66, 71/37, 71/39, 71/63
[51] Int. Cl. .......................................C05b 11/06
[58] Field of Search ..................71/39, 35, 37, 63; 23/119

[56] References Cited

UNITED STATES PATENTS

| | | | |
|---|---|---|---|
| 1,517,687 | 12/1924 | Voerkelius | 71/39 |
| 1,758,448 | 5/1930 | Liljenroth | 71/39 X |
| 1,902,649 | 3/1933 | Larsson | 23/119 |
| 2,795,486 | 6/1957 | Pluim | 23/119 |
| 3,172,751 | 3/1965 | Datin | 71/37 |

FOREIGN PATENTS OR APPLICATIONS

| | | | |
|---|---|---|---|
| 810,208 | 3/1959 | Great Britain | 71/34 |
| 1,153,037 | 8/1963 | Germany | 71/37 |

OTHER PUBLICATIONS

Mellor, A Comprehensive Treatise On Inorganic & Theoretical Chemistry, Vol. 2, 1922, pages 702– 705, Longmans, Green & Co., New York.

*Primary Examiner*—Rueben Friedman
*Assistant Examiner*—Bennett H. Levenson
*Attorney*—Kurt Kelman

[57] ABSTRACT

A process for the preparation of nitrophosphate fertilizer by acidulation of phosphate rock by means of a mixture of $HNO_3$ and $NH_4HSO_4$, wherein the $NH_4HSO_4$, serves for the acidulation as well as for the precipitation of the calcium present in the phosphate rock as $CaSO_4 \cdot 2H_2O$. The latter is treated with a gas mixture containing $NH_3$ and $CO_2$, forming $CaCO_3$ and $(NH_4)_2SO$. The $(NH_4)_2SO_4$ is thermally decomposed to form $NH_4HSO_4$, which is recycled to the acidulation reaction. The acidulated phosphate rock solution is neutralized with $NH_3$ to obtain the nitrophosphate fertilizer.

2 Claims, 1 Drawing Figure

Patented April 4, 1972 3,653,872
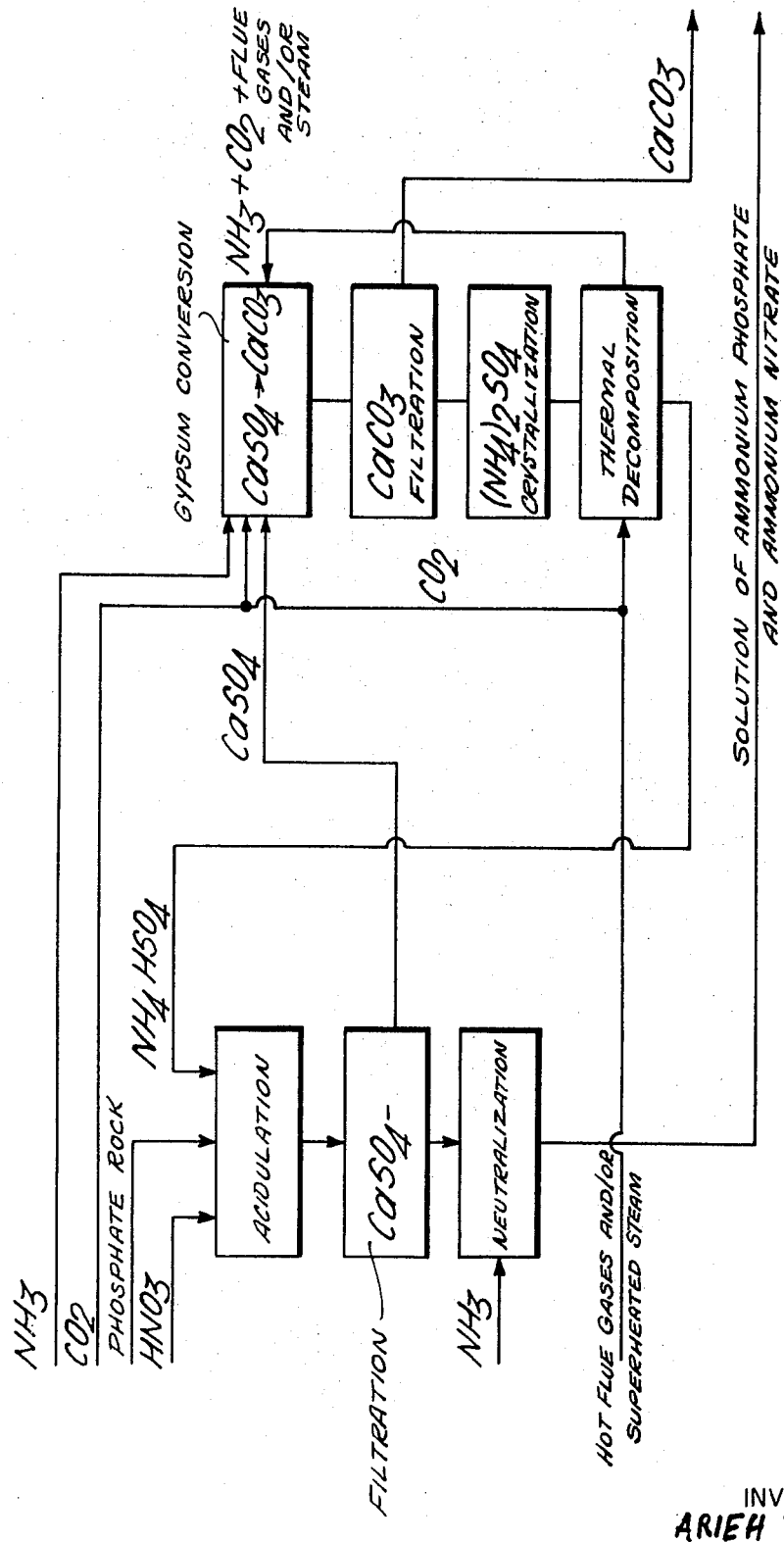
INVENTOR
ARIEH Y. GUERY
BY
AGENT

PROCESS FOR THE PREPARATION OF A NITROPHOSPHATE FERTILIZER

The present invention is concerned with a process for the preparation of a nitrophosphate fertilizer.

In the proposed process, the amount of nitric acid required for the dissolution of a given kind of phosphate rock is about half of that used in known nitrophosphate processes, resulting in a fertilizer with a proportionally lower nitrogen to phosphorus pentoxide ratio. In current practice, calcium nitrate produced in the dissolution of phosphate rock in nitric acid is either separated by low temperature crystallization or reacted with ammonium sulphate, resulting in the precipitation of gypsum and the production of an equivalent amount of ammonium nitrate.

The acidulation of phosphate rock in conventional nitrophosphate production involving precipitation of gypsum can be presented as follows:

(1) $Ca_{10}F_2(PO_4)_6 + 20HNO_3 + 10(NH_4)_2SO_4$
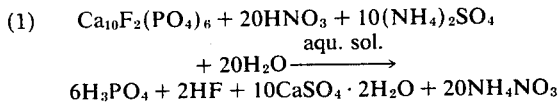
$6H_3PO_4 + 2HF + 10CaSO_4 \cdot 2H_2O + 20NH_4NO_3$ Gypsum is filtered off and converted to ammonium sulphate by reaction with ammonia and $CO_2$. Ammonium sulphate produced is recycled to reaction 1. The filtrate is neutralized to yield nitrophosphate fertilizer.

According to the present invention, the ammonium sulphate produced from gypsum is decomposed by heating to acid ammonium sulphate and free ammonia. The latter is used again for the conversion of gypsum to ammonium sulphate. Acid ammonium sulphate $NH_4HSO_4$, along with the required amount of nitric acid, is used for the acidulation of phosphate rock in which the acid sulphate replaces an equivalent amount of nitric acid.

The process of the invention is illustrated in the flow sheet of the accompanying drawing illustrating the sequence of reaction steps.

As shown in the flow sheet by the legends, phosphate rock is acidulated with a mixture of $HNO_3$ and $NH_4HSO_4$ while the acid ammonium sulphate simultaneously precipitates calcium present in the phosphate rock to obtain $CaSO_4$. The calcium sulphate is separated and treated with $NH_3$ and $CO_2$ to obtain $CaCO_3$ and $(NH_4)_2SO_4$. The calcium carbonate is removed and the recovered ammonium sulphate crystals are thermally decomposed. The ammonium sulphate crystals are first heated to a temperature at which decomposition starts whereby evolution of ammonia commences and an ammonium sulphate containing melt of acid ammonium sulphate is obtained. The temperature of the melt is then raised and the melt is contacted countercurrently with a stream of hot stripping gas containing $CO_2$ in admixture with superheated steam and/or hot flue gases freed of oxygen until a melt containing more than 90 percent $NH_4HSO_4$ is obtained. The $CO_2$ and evolved $NH_3$ including the hot flue gases and/or superheated steam are passed back to the gypsum conversion while the acid ammonium sulphate is recycled to the phosphate rock acidulation step. After the separation of calcium sulphate, the acidulated phosphate rock solution is neutralized with ammonia to obtain the nitrphosphate fertilizer.

A. ACIDULATION (2) $Ca_{10}F_2(PO_4)_6 + 10NHO_3 + 10NH_4HSO_4$
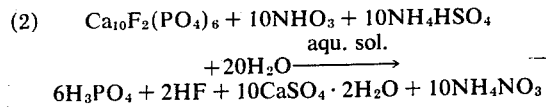
$6H_3PO_4 + 2HF + 10CaSO_4 \cdot 2H_2O + 10NH_4NO_3$ It can be seen from reaction 2 that, in the proposed process, the ratio of N : $P_2O_5$ is half of that obtained in the conventional process (Reaction 1). In case the acid ammonium sulphate in Reaction 2 contains some undissociated ammonium sulphate and as result thereof has too low an acidity, this shortage is made up by addition of an equivalent amount of nitric acid.

B. NEUTRALIZATION

After filtration of $CaSO_4 \cdot 2H_2O$, the filtrate obtained in Reaction 2 containing free $H_3PO_4$, HF and ammonium nitrate, is neutralized by ammonia to yield nitrophosphate fertilizer.

C. RECOVERY OF ACID AMMONIUM SULPHATE

The gypsum precipitated in reaction 2 is first converted to ammonium sulphate by reaction with ammonia and carbon dioxide.

(3) $CaSO_4 \cdot 2H_2O + 2NH_3 + CO_2$ 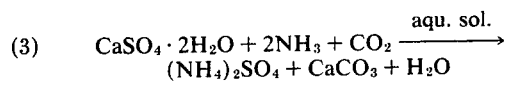
$(NH_4)_2SO_4 + CaCO_3 + H_2O$ Precipitated calcium carbonate is filtered off. Ammonium sulphate crystals are recovered from the filtrate. The ammonium sulphate crystals are then subjected to a temperature above 300°C., causing decomposition into the acid salt and free ammonia according to the following reaction:

(4) $(NH_4)_2SO_4$ 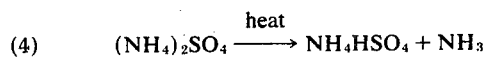 $NH_4HSO_4 + NH_3$

This can be achieved by heating the $(NH_4)_2SO_4$ crystals to 350°–450°C. thereby obtaining a melt of $NH_4HSO_4$ and free ammonia. This can be done by heating first the ammonium sulphate crystals at a temperature where the decomposition starts, whereby evolution of ammonia commences and a $(NH_4)_2SO_4$ containing melt of $NH_4HSO_4$ is obtained. In this stage, the temperature may be 160°–200°C., or even higher. In order to decompose the remaining $(NH_4)_2SO_4$ as much as possible and to obtain a mixture with more than 90 percent $NH_4HSO_4$, the melt is heated to about 400°C. and contacted in countercurrent with a stream of a hot stripping gas in a suitable contacting device like a packed column or a spraying tower. It is advantageous to use for this stripping the relatively pure $CO_2$, which is used for the gypsum conversion, in a mixture with hot flue gases and/or superheated steam, after which the mixture containing $CO_2$ and $NH_3$ along with the hot flue gases and/or superheated steam is passed to the gypsum conversion reactor for forming ammonium sulphate and preparing calcium carbonate. The hot flue gases may be freed from oxygen by passing through a bed of red-hot coke, before being mixed with relatively pure $CO_2$.

$NH_4HSO_4$ is recycled to the phosphate rock acidulation reaction while free $NH_3$ is returned to the gypsum to ammonium sulphate conversion step.

Since ammonium sulphate has to be in solid form for its conversion to the acid salt, and in order to minimize the need for evaporation of ammonium sulphate solution, the reaction of $NH_3$ and $CO_2$ with gypsum may be carried out in a known manner in a reaction liquor saturated with ammonium sulphate, containing calcium carbonate and ammonium sulphate crystals in suspension, to produce ammonium sulphate and calcium carbonate crystals directly. The latter can be separated by making use of their difference in specific gravity or in particle size.

If, for example, this separation is carried out in a hydrocyclone, heavier ammonium sulphate crystals will be received from the bottom fraction and lighter calcium carbonate crystals from the overhead stream.

Some ammonium sulphate, possibly carried along in the calcium carbonate fraction may be effectively used, by using the calcium carbonate with the ammonium sulphate impurity for the preparation of nitrolime fertilizer.

I claim:

1. A process for the preparation of a nitrophosphate fertilizer from phosphate rock, comprising the steps of
   1. acidulating the phosphate rock with a mixture of $HNO_3$ and $NH_4HSO_4$,
   2. simultaneously precipitating calcium present in the phosphate rock with the $NH_4HSO_4$ to obtain $CaSO_4$, and separating the $CaSO_4$,
   3. treating the separated $CaSO_4$ with a gas mixture containing $CO_2$ and $NH_3$ to obtain $CaCO_3$ and $(NH_4)_2SO_4$,
   4. removing the $CaCO_3$ by filtration, and recovering $(NH_4)_2SOB4$ crystals from the filtrate,
   5. thermally decomposing the $(NH_4)_2SO_4$ by a. heating the $(NH_4)_2SO_4$ at a temperature at which decomposition thereof starts, thereby evolving ammonia, and until an $(NH_4)_2SO_4$ containing melt of $NH_4HSO_4$ is obtained, and b. raising the temperature of the melt to about 400°C. and contacting the melt countercurrently with a stream of hot stripping gas containing $CO_2$ in admixture with superheated steam and/or hot flue gases freed from oxygen, until a melt containing more than 90 percent $NH_4HSO_4$ is obtained, 6. passing the stripping gas mixture resulting from step (5), containing $CO_2$ and $NH_3$ along with the steam and/or flue gases, to step (3) for converting $CaSO_4$ to $CaCO_3$ and $(NH_4)_2SO_4$, which are separated pursuant to step (4), and the recovered $(NH_4)_2SO_4$ is recycled to step (5) for reconversion to $NH_4HSO_4$, 7. recycling the $NH_4HSO_4$ from step (6) to step (1), and 8. neutralizing the acidulated phosphate rock solution, after the separation of the $CaSO_4$ pursuant to step (2), with $NH_3$ to obtain the nitrophosphate fertilizer.

2. The process of claim 1, wherein the temperature at step (5a) is in the range of at least 160° to 200°C.

* * * * *